United States Patent

Sirrenberg et al.

[11] 3,880,960
[45] Apr. 29, 1975

[54] O-PHENYL-N-ALKYL(ALKENYL)-ETHANEPHOSPHONIC ACID ESTER AMIDES

[75] Inventors: Wilhelm Sirrenberg, Sprockhoevel; Bernhard Homeyer, Opladen, both of Germany

[73] Assignee: Bayer Aktiengesellschaft, Leverkusen, Germany

[22] Filed: Sept. 7, 1973

[21] Appl. No.: 395,091

[30] Foreign Application Priority Data
Sept. 20, 1972 Germany.............................. 2246104

[52] U.S. Cl. ............... 260/956; 260/959; 424/219; 424/220
[51] Int. Cl.......... A01n 9/36; C07f 9/40; C07f 9/44
[58] Field of Search............................ 260/956, 959

[56] References Cited
UNITED STATES PATENTS
3,260,712   7/1966   Schrader..................... 260/959 X FOREIGN PATENTS OR APPLICATIONS
169,527    3/1965   U.S.S.R................................ 260/959

OTHER PUBLICATIONS

Mel'nikov et al., Chemical Abstracts, Vol. 68, page 1126, (1968).

Primary Examiner—Lorraine A. Weinberger
Assistant Examiner—Richard L. Raymond
Attorney, Agent, or Firm—Burgess, Dinklage & Sprung

[57] ABSTRACT

O-phenyl-N-alkyl(alkenyl)-ethanephosphonic acid ester amides of the general formula

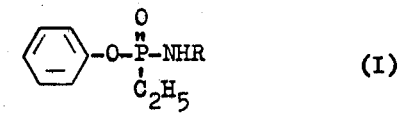

in which R is alkyl or alkenyl of up to 6 carbon atoms, which possess nematicidal properties.

6 Claims, No Drawings

O-PHENYL-N-ALKYL(ALKENYL)-ETHANEPHOSPHONIC ACID ESTER AMIDES

The present invention relates to and has for its objects the provision of particular new O-phenyl-N-alkyl (alkenyl)-ethanephosphonic acid ester amides, which possess nematicidal properties, active compositions in the form of mixtures of such compounds with solid and liquid dispersible carrier vehicles, and methods for producing such compounds and for using such compounds in a new way especially for combating pests, e.g. nematodes, with other and further objects becoming apparent from a study of the within specification and accompanying examples.

It has been disclosed in U.S. Pat. No. 3,004,054 that O,O-dialkyl-O-phenylthionophosphoric acid esters, such as O,O-diethyl-O-(-(2,4-dichlorophenyl)-thionophosphoric acid ester (Compound A), display a nematicidal action.

The present invention provides, as new compounds, the O-phenyl-N-alkyl(alkenyl)-ethanephosphonic acid ester amides of the formula

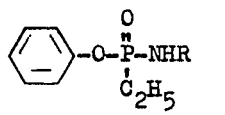

(I)

in which R is alkyl or alkenyl of up to 6 carbon atoms.

Preferably R is straight-chain or branched lower alkyl or alkenyl of up to 4 carbon atoms, especially 3 or 4 carbon atoms.

Surprisingly, the O-phenyl-N-alkyl(alkenyl)-ethanephosphonic acid ester amides according to the invention show a substantially greater nematicidal action than the prior-art O,O-dialkyl-O-phenylthionophosphonic acid esters of analogous structure and identical type of action. The compounds according to the present invention thus represent a genuine enrichment of the art.

The present invention also provides a process for the preparation of an O-phenyl-N-alkyl(alkenyl)-ethanephosphonic acid ester amide of the formula (I) in which ethanephosphonic acid dichloride of the formula

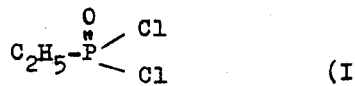

(II)

is reacted with phenol in the presence of an acid-binding agent, or with an alkali metal salt, alkaline earth metal salt or ammonium salt of phenol, optionally in the presence of a diluent, and the resulting intermediate (namely O-phenylethanephosphonic acid ester chloride) is subsequently reacted, optionally without isolation, with an amine of the general formula

R-NH₂

in which R has the above-mentioned meaning, if necessary with a further addition of acid-binding agent and/or a diluent.

If ethanephosphonic acid dichloride, phenol and butylamine are used as starting materials, the course of the reaction can be represented by the following equations:

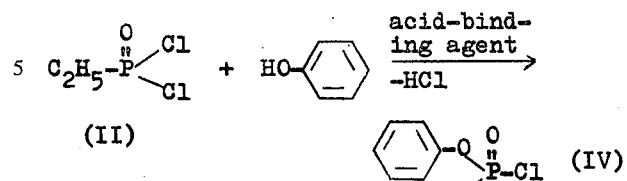

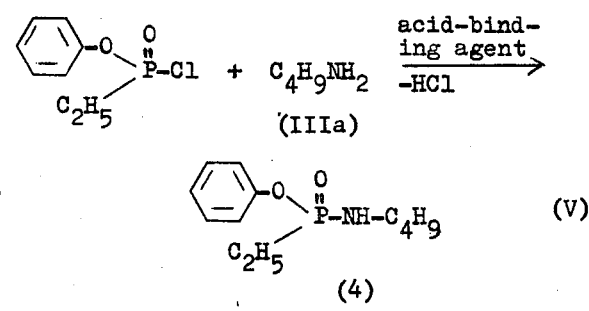

(4)

The starting materials required, namely the amines, the ethanephosphonic acid dichloride and the phenol are known from the literature and can be prepared easily even on an industrial scale.

The following may be mentioned as examples of amines of the formula (III): methylamine, ethylamine, n- and isopropylamine, n-, sec.-, tert.- and isobutylamine and allylamine.

The preparative process is preferably carried out with conjoint use of a suitable solvent or diluent. Practically all inert organic solvents can be used for this purpose, especially aliphatic and aromatic hydrocarbons which can optionally be chlorinated, such as benzene, toluene, xylenes, benzine, methylene chloride, chloroform, carbon tetrachloride and chlorobenzene; ethers, for example diethyl ether, dibutyl ether, and dioxane; ketones such as acetone, methyl ethyl ketone, methylisopropyl ketone and methyl isobutyl ketone; and nitriles, such as acetonitrile and propionitrile.

It is possible to use all customary acid-binding agents. Alkali metal carbonates and alkali metal alcoholates, such as sodium carbonate and potassium carbonate, sodium methylate and ethylate and potassium methylate and ethylate, as well as aliphatic, aromatic or heterocyclic amines, for example triethylamine, dimethylamine, dimethylaniline, dimethylbenzylamine and pyridine, have proved particularly successful.

Moreover, an excess of the particular amine (III) which is used can also serve as the acid-binding agent.

The reaction temperature can be varied within a fairly wide range. In general, the reaction is carried out at from −10° to +100°C, preferably at from −5° to +40°C, in both process steps.

The reaction is in general allowed to take place at normal pressure.

In carrying out the process, the reactants are in most cases employed in equimolar amounts. An excess of one or other component produces no significant advantages. In general, a solution of the phenol is added dropwise to a solution of the ethanephosphonic acid dichloride (II) at the indicated temperatures, in the presence of an acid-binding agent, the mixture is allowed to continue to react for one to several hours, and a solution of the amine (III) and fresh acid-binding agent is then added dropwise.

After completion of the reaction, the salt-like residue which has separated out is either filtered off or washed out with water. The filtrate is worked up in the usual manner by washing, drying and concentration or distillation.

The new compounds are obtained in the form of oils which in part cannot be distilled without decomposition but can be freed of the last volatile constituents by prolonged heating to moderately elevated temperatures under reduced pressure, and can be purified in this way. They are generally characterized by the refractive index.

The active compounds according to the invention combine low toxicity to warm-blooded animals with strong nematicidal properties and can therefore be used for combating nematodes, especially phytopathogenic nematodes. These essentially include leaf nematodes (*Aphelenchoides*), such as the chrysanthemum eelworm A. *ritzemabosi*), the leafblotch eelworm (A. *fragariae*), and the rice eelworm A. *oryzae*); stem nematodes (*Ditylenchus*), such as the stem eelworm (D. *dipsaci*); root-knot (*Meloidogyne*), such as M. *arenaria* and M. *incognita*; cyst-forming nematodes (*Heterodera*), such as the potato cyst eelworm (H. *rostochiensis*), and the beet cyst eelworm (H. *schactii*); as well as non-parasitic root nematodes, for example of the genera *Pratylenchus*, *Paratylenchus*, *Rotylenchus*, *Xiphinema* and *Radopholus*.

The active compounds according to the instant invention can be utilized, if desired, in the form of the usual formulations or compositions with conventional inert (i.e. plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.) halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g. alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other nematicides, or insecticides, acaricides, rodenticides, fungicides, bactericides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10%, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

When used against nematodes, the preparations are usually applied uniformly in amounts of from 1 to 100 kg of active compound per hectare and are subsequently worked into the soil.

Furthermore, the present invention contemplates methods of selectively killing, combating or controlling pests, e.g., nematodes, which comprises applying to at least one of correspondingly (a) such nematodes, and (b) the corresponding habitat thereof, i.e., the locus to be protected, a correspondingly combative or toxic amount, i.e., a nematicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Critical concentration test

Test nematode: Meloidogyne sp.
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration.

The preparation of active compound was intimately mixed with soil which was heavily infested with the test nematodes. The concentration of the active compound in the preparation was of practically no importance; only the amount of active compound per unit volume of soil, which is given in p.p.m, was decisive. The soil was filled into pots, lettuce was sown and the pots were kept at a greenhouse temperature of 27°C. After 4 weeks, the lettuce roots were examined for infestation with nematodes, and the degree of effectiveness of the active compound was determined as a percentage. The degree of effectiveness was 100 percent when infestation was completely avoided; it was 0 percent when the infestation was exactly the same as in the case of the control plants in untreated soil which has been infested in the same manner.

The active compound, the amounts applied and the results can be seen from the following Table 1:

Table 1

Critical concentration test of nematicides

| Active compound | Active compound concentration in ppm | Degree of destruction in % |
|---|---|---|
| (C₂H₅O)₂P(S)-O-⟨phenyl-Cl,Cl⟩ (known) (A) | 40 | 98 |
| | 20 | 80 |
| | 10 | 50 |

Table 1 (continued)

Critical concentration test of nematicides

| Active compound | Active compound concentration in ppm | Degree of destruction in % |
|---|---|---|
| ⟨phenyl⟩-O-P(O)(C₂H₅)-NH-CH₂-CH=CH₂ (2) | 40 | 100 |
| | 20 | 100 |
| | 10 | 98 |
| | 5 | 75 |
| | 2.5 | 50 |
| ⟨phenyl⟩-O-P(O)(C₂H₅)-NH-C₃H₇-iso (1) | 40 | 100 |
| | 20 | 100 |
| | 10 | 100 |
| | 5 | 98 |
| | 2.5 | 95 |
| | 1.25 | 90 |
| ⟨phenyl⟩-O-P(O)(C₂H₅)-NH-C₃H₇-n (3) | 40 | 100 |
| | 20 | 98 |
| | 10 | 95 |
| | 5 | 50 |
| ⟨phenyl⟩-O-P(O)(C₂H₅)-NH-C₄H₉-sec. (4) | 40 | 100 |
| | 20 | 98 |
| | 10 | 95 |
| | 5 | 50 |

The process of this invention is illustrated in the following preparative Examples:

EXAMPLE 2

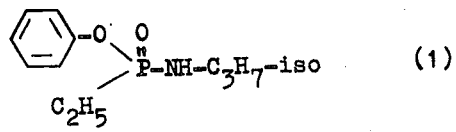

(1)

A solution of 188 g of phenol, 204 g of triethylamine and 600 ml of toluene was added dropwise over the course of 30 minutes to 354 g (2.4 moles) of ethanephosphonic acid dichloride in 1.5 l of toluene at −20° to −10°C, with vigorous stirring. The batch was stirred for 2 hours at 0°–20°C and was then cooled to between −10° and 0°C. At this temperature, a solution of 264 g of isopropylamine in 200 ml of toluene was added dropwise. To complete the reaction, the mixture was stirred for a further 1.5 hours at 20°C. Thereafter, one liter of ice-cold water was stirred in. A separation into two phases occurred. The aqueous phase was withdrawn and discarded. The organic phase was vigorously stirred with one liter of water to which 60 ml of 45 percent strength sodium hydroxide solution had been added. The aqueous alkaline phase was separated off and the organic phase was washed once with water and dried. After distilling off the solvent in vacuo, a light yellow oil was obtained, which could be purified by distillation. 321 g (70.5 percent of theory) of O-phenyl-N-isopropyl-ethanephosphonic acid ester amide of refractive index $n_D^{20}$ of 1.5065 were thus obtained at 132°–134°C and 0.01 mm Hg. The oil crystallized completely and had a melting point of 47°C (ligroin).

EXAMPLE 3

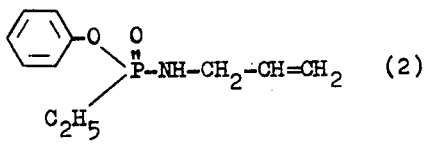

A solution of 31.3 g of phenol and 34 g of triethylamine in 70 ml of benzene was added dropwise to 49 g (0.33 mole) of ethanephosphonic acid dichloride in 300 ml of benzene at 0° – 10°C. The batch was stirred for ¾ hour at 30°C and thereafter the triethylaminehydrochloride which had precipitated was filtered off. The filtrate was added dropwise, at 0° – 10°C, to a solution of 34 g of triethylamine and 20 g of allylamine in 500 ml of benzene. To complete the reaction, the batch was stirred for a further ¾ hour at 30°C. Thereafter it was worked up as described in Example 2. 70 g (93 percent of theory) of O-phenyl-N-allylethanephosphonic acid ester amide of refractive index $n_D^{20}$ of 1.5240 were obtained. The compound could be purified by distillation. Boiling point 143°C/0.01 mm Hg.

The following compounds were prepared by methods analogous to those described in Examples 2 and 3.

| Formula | Physical properties (refractive index) | Yields (% of theory) |
|---|---|---|
| 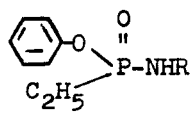 (3) | $n_D^{20}$: 1.5120 | 45.5 |
| (4) | $n_D^{20}$: 1.5086 | 67.5 |

It will be appreciated that the instant specification and examples are set forth by way of illustration and not limitation, and that various modifications and changes may be made without departing from the spirit and scope of the present invention.

What is claimed is:

1. An O-phenyl-N-alkyl(alkenyl)-ethanephosphonic acid ester amide of the formula in which R is alkyl or alkenyl of up to 6 carbon atoms.

2. A compound according to claim 1, in which R is alkyl or alkenyl of up to 4 carbon atoms.

3. The compound according to claim 1, wherein such compound is O-phenyl-N-isopropyl-ethane-phosphonic acid ester amide of the formula

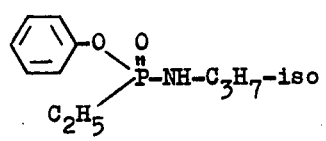

4. The compound according to claim 1, wherein such compound is O-phenyl-N-allyl-ethanephosphonic acid ester amide of the formula

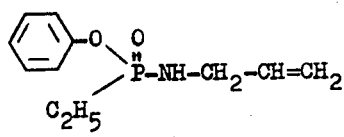

5. The compound according to claim 1, wherein such compound is O-phenyl-N-propyl-ethanephosphonic acid ester amide of the formula

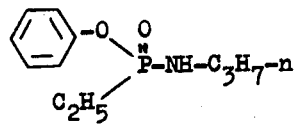

6. The compound according to claim 1, wherein such compound is O-phenyl-N-sec.-butyl-ethanephosphonic acid ester amide of the formula

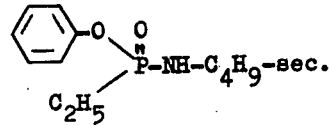

* * * * *